(12) United States Patent
Blanksby et al.

(10) Patent No.: US 9,769,865 B2
(45) Date of Patent: Sep. 19, 2017

(54) OPPORTUNISTIC DATA TRANSFER

(71) Applicant: Avago Technologies General IP (Singapore) Pte. Ltd., Singapore (SG)

(72) Inventors: Andrew Blanksby, Lake Oswego, OR (US); David Garrett, Tustin, CA (US); Matthias Korb, Mission Viejo, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 117 days.

(21) Appl. No.: 14/746,442

(22) Filed: Jun. 22, 2015

(65) Prior Publication Data

US 2016/0353489 A1 Dec. 1, 2016

Related U.S. Application Data

(60) Provisional application No. 62/166,346, filed on May 26, 2015.

(51) Int. Cl.
| | |
|---|---|
| *H04W 76/02* | (2009.01) |
| *H04W 72/12* | (2009.01) |
| *H04W 8/00* | (2009.01) |
| *H04W 48/12* | (2009.01) |
| *H04W 48/14* | (2009.01) |
| *H04W 48/18* | (2009.01) |

(52) U.S. Cl.
CPC ..... *H04W 76/026* (2013.01); *H04W 72/1205* (2013.01); *H04W 8/005* (2013.01); *H04W 48/12* (2013.01); *H04W 48/14* (2013.01); *H04W 48/18* (2013.01); *Y02B 60/50* (2013.01)

(58) Field of Classification Search
CPC ............ H04W 72/1205; H04W 76/02; H04W 76/022; H04W 76/025
See application file for complete search history.

(56) References Cited

U.S. PATENT DOCUMENTS

| | | | | |
|---|---|---|---|---|
| 7,565,447 B2 * | 7/2009 | Gellens | ................ | H04W 76/02 709/223 |
| 8,238,913 B1 * | 8/2012 | Bhattacharyya | ........ | H04L 69/14 370/331 |

(Continued)

*Primary Examiner* — Ashley Shivers
(74) *Attorney, Agent, or Firm* — Sterne, Kessler, Goldstein & Fox P.L.L.C.

(57) ABSTRACT

Methods, systems, and apparatuses for opportunistic data transfer (ODT) are provided. ODT improves network coverage, reliability and/or efficiency by permitting data transfer consumers and network access providers to take advantage of communication opportunities that may be mutually beneficial. Fixed and mobile, personal or business, wired or wireless devices, may participate as ODT network operators, providers and/or consumers. ODT participants may be motivated to participate, for example, to reduce battery consumption and improve network coverage, reduce network congestion and interference. A phone, for example, may be enabled to send data to an Internet destination by ODT in lieu of a cellular network in particular circumstances, such as cellular network unavailability, with less costly data transfer and/or less battery power consumption. ODTs may be ad hoc or preauthorized and may be tracked, accounted, and compensated for, such as according to ODT service terms selected by each provider.

20 Claims, 12 Drawing Sheets

(56) References Cited

U.S. PATENT DOCUMENTS

2013/0198373 A1* 8/2013 Zalmanovitch ....... H04W 24/02
   709/224
2015/0163828 A1* 6/2015 Vandwalle .......... H04W 28/044
   370/330

* cited by examiner configure a providing device that provides a first wireless network and configure a consuming device without access to the wireless network to participate in an opportunistic data transfer (ODT) from the consuming device to a destination on a second network via the first wireless network

OPPORTUNISTIC DATA TRANSFER

CROSS-REFERENCE TO RELATED APPLICATIONS

This application claims the benefit of U.S. Provisional Application No. 62/166,346, filed on May 26, 2015, the entirety of which is incorporated by reference herein.

BACKGROUND

Proliferation of fixed and mobile devices and applications used to access networks, such as the Internet, present challenges to network coverage, reliability and efficiency for devices and networks.

BRIEF SUMMARY

Methods, systems, and apparatuses are described for opportunistic data transfer (ODT), substantially as shown in and/or described herein in connection with at least one of the figures, as set forth more completely in the claims.

BRIEF DESCRIPTION OF THE DRAWINGS/FIGURES

The accompanying drawings, which are incorporated herein and form part of the specification, illustrate a plurality of embodiments and, together with the description, further serve to explain the principles involved and to enable a person skilled in the relevant art(s) to make and use the disclosed embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
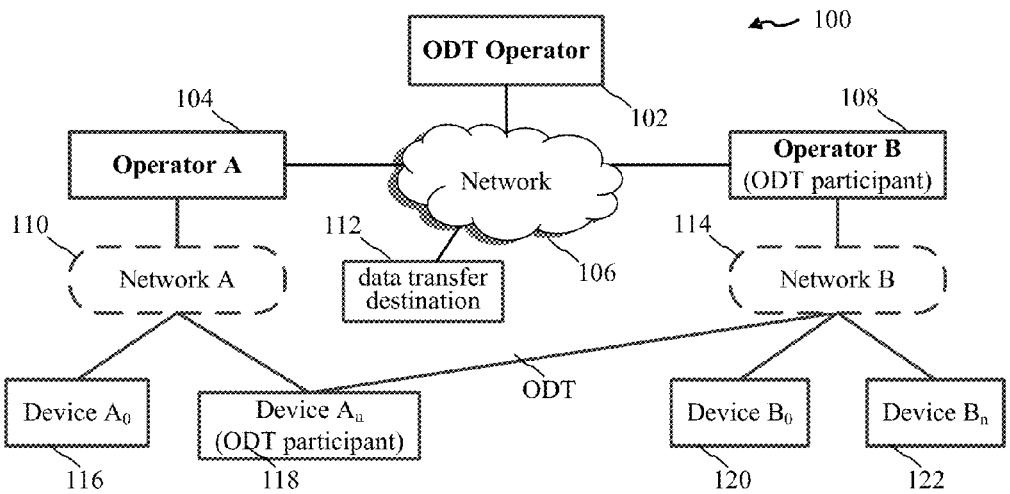
FIG. 1 shows a block diagram of an example environment in which ODT features may be implemented, in embodiments.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Certain terms are used throughout the following description and claims to refer to particular system components and configurations. The discussion of embodiments is not intended to distinguish between components that differ in name but not function. The terms "including" and "comprising" are used in an open-ended fashion, and thus should be interpreted to mean "including, but not limited to . . . " Also, the term "couple" or "couples" is intended to mean either an indirect or direct electrical connection.

Still further, it should be noted that the drawings/figures are not drawn to scale unless otherwise noted herein.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner.

II. Exemplary Opportunistic Data Transfer

Methods, systems, and apparatuses will now be described for opportunistic data transfer (ODT). Examples are provided in figures and described herein. ODT is the reconfiguration of network availability in an ad hoc or preauthorized manner, to enable data transfer over one or more network(s) that is/are not accessible under normal circumstances, but is/are made available according to ODT enabling techniques disclosed herein. ODT may improve network coverage, reliability and/or efficiency by permitting data transfer consumers and network access providers to take advantage of communication opportunities that may be mutually beneficial. Fixed and mobile, personal or business, wired or wireless devices (e.g. mobile phones, modems, routers) may participate as ODT network operators, providers and/or consumers. ODT participants may be motivated to participate, for example, to reduce battery consumption and improve network coverage (e.g. by lower power transmissions to nearby ODT providers instead of higher power transmissions to distant cell towers), reduce network congestion and interference (e.g. by distributing transmissions, reducing transmission distance, power and retransmissions). A phone, for example, may be enabled to send data to an Internet destination by ODT in lieu of a cellular network under circumstances, such as cellular network unavailability, less costly data transfer, or battery power conservation. Participation may be ad hoc and/or preauthorized. ODTs may be ad hoc or preauthorized and may be tracked, accounted and compensated, e.g., according to ODT service terms selected by each provider.

In an example, one or both of a providing device that provides a first wireless network and a consuming device without access to the wireless network may be configured to participate in an ODT from the consuming device to a destination on a second network via the first wireless network, thereby expanding data transfer options for consumer devices and expanding the utility of provider devices.

In another example, a first providing device that provides a first wireless network may become an ODT participant and may participate in an ODT from a first consuming device without access to the first wireless network to a destination on a second network via the first wireless network. A first consuming device without access to the first wireless network may become an ODT participant and may participate in the ODT from the first consuming device to the destination on the second network via the first wireless network. An ODT network operator may provide centralized or distributed ODT services for a plurality of ODT providers and/or may provide local ODT services. ODT services may comprise, for example, ODT registrations, authorizations, discovery, management, terms, permissions, confirmations, tracking, accounting and compensation for ODT participants. An ODT network operator may be integrated into ODT providers for local or distributed ODT services.

FIG. 1 shows a block diagram of an example environment in which ODT features may be implemented. As shown in FIG. 1, environment 100 includes an ODT operator 102, an operator A 104, an operator B 108, a network 106, a network 110 (A), a network 114 (B), devices 116-118 (A0 through An), devices 120-122 (B0 through Bn), and a data transfer destination 112. Other examples and implementations may contain the same or different numbers of components, types of components, architectures and configurations. There may be any number of network operators, e.g., alternative or in addition to operator A 104 and operator B 108. There may be any number of ODT operators, e.g., alternative or in addition to ODT operator 102. Multiple network operators and/or ODT operators may provide, for example, competitive selection for the most appropriate (e.g. best) ODT terms. Components may be configured to communication in wired and/or wireless manners. ODT operator 102, operator A 104, operator B 108, devices 116-118 (A0 through An), devices 120-122 may each be configured as hardware (e.g., one or more electrical devices) or hardware combined with one or both of software and firmware.

ODT operator 102 operates all or a portion of an ODT network. ODT operator 102 may provide centralized or distributed ODT services for a plurality of ODT providers and/or may provide local ODT services. ODT operator 102 may provide ODT services, such as, ODT registrations, authorizations, discovery, management, terms, permissions, confirmations, tracking, accounting and compensation for ODT participants. ODT operator 102 may comprise, for example, one or more servers coupled to network 106. Network 106 may comprise one or more networks, such as the Internet. ODT 102 may be integrated in part or in whole into one or more ODT participants, such as ODT network provider participant operator B 108.

Operator A 104 may operate and provide services to one or more networks, such as network A 110 for devices A0 116 through An 118. Operator A 104 may opt, or its owner or user may opt for it, to be an ODT participant. As an example, operator A 104 may provide ad hoc and/or preauthorized ODT opportunities and/or ODT services to devices without access to network A 110, such as devices B0 120 through Bn 122. Operator A 104 may comprise a wide variety of devices and technologies that provide one or more networks. For example, operator A 104 may comprise one or more of a modem, router, switch, bridge, hub, firewall, gateway, cable set top box, gaming console, cellular telephone, hand held device, client computer, server computer, proxy server, base transceiver station (BTS), and/or any other device or group of devices that provide one or more networks. Operator A 104 may provide an access point (AP) to an unlimited number of devices, communication channels, etc. A network may comprise one or more wired and or wireless networks, such as a personal area network (PAN), local area network (LAN) or wide area network (WAN). Network connections or other connections between ODT participating devices or application end points may comprise any wired and/or wireless communication technology, such as 802.11a/b/g based WLAN, 802.16 based WLAN, IEEE 802.16 (e.g., Worldwide Interoperability for Microwave Access (WiMAX), NFC, Bluetooth, Zigbee, any radio access technology (RAT), etc. Operator A 104 may communicate with one or more additional networks, e.g., network 106 (e.g. Internet).

Operator B 108 may operate and provide services to one or more networks, such as network B 114 for devices B0 120 through Bn 122. Operator B 108 may opt, or its owner or user may opt for it, to be an ODT participant. As an example, operator b 108 may provide ad hoc and/or preauthorized ODT opportunities and/or ODT services to devices without access to network B 114, such as devices A0 116 through An 118. Operator B 108 may comprise a wide variety of wired and/or wireless devices and technologies that provide one or more wired and/or wireless networks. For example, operator B 108 may comprise one or more of a modem, router, switch, hub, firewall, gateway, cable set top box, gaming console, cellular telephone, hand held device, client computer, server computer, proxy server, BTS, and/or any other device or group of devices that provide one or more networks. Operator B 108 may provide an AP for one to an unlimited number of devices, communication channels, etc. Operator B 108 may communicate with one or more additional networks, e.g., network 106.

Device A0 116 through device An 118 and device B0 120 through device Bn 122 may comprise any number of devices capable of communicating on a network. One or more of device A0 116 through device An 118 and device B0 120 through device Bn 122 may comprise one or more Internet of Things (IoT) applications that may use Internet Protocol (IP) connectivity. Device A0 116 through device An 118 may be coupled to one or more home networks, e.g. network A 110, on which they may transfer data to various destinations, including on other networks, e.g., data transfer destination 112 on network 106. Device B0 120 through device Bn 122 may be coupled to one or more home networks, e.g. network B 114, on which they may transfer data to various destinations, including on other networks, e.g., data transfer destination 112 on network 106. Device A0 116 through device An 118 and device B0 120 through device Bn 122 may comprise a wide variety of wired and/or wireless devices and technologies capable of communicating on one or more wired and/or wireless networks. For example, device A0 116 through device An 118 and device B0 120 through device Bn 122 may each comprise a cellular telephone, hand held device, client computer, server computer, smart home electronics and appliances, etc.

Device A0 116 through device An 118 and device B0 120 through device Bn 122 may opt, or their owners or users may opt for them, to be ODT participants. Being an ODT participant, as a consumer and/or provider, may provide benefits, such as expanding data transfer opportunities beyond networks on which devices are authorized to communicate. As an example, while device A0 116 through device An 118 are not authorized to transmit data on one or more (perhaps millions of networks), such as network B 114, as ODT participants they may transfer data through network B 114, for example, when operator B 108 is an ODT participant and its terms of ODT service are met.

For example, network A 110 may be a wireless network (e.g., WLAN) for a first home, and network B 114 may be a wireless network for a second home. Under normal circumstances, a device, such as device An 118 of the first home may not have access to network B 114 of the second home. ODT, as disclosed herein, may enable access to network B 114 for data transfer by device An 118 according to the techniques described herein. Such access may be enabled for any reason, including a failure in network A 110, a failure of operator A 104, etc. Such access provides device An 118 with the benefit of additional/alternative network access, and an owner of network B 114/operator B 108 may benefit by receiving a form of compensation (e.g., money, bandwidth on network A 110) provided by an owner or user of device An 118 or other entity.

FIG. 1 illustrates an ODT between device An 118 and network B 114, which operator B 108 forwards through network 106 to data transfer destination 112. ODT may be ad hoc and/or preauthorized by operator B 108 and/or ODT operator 102.

ODT participation may improve network coverage, reliability and/or efficiency by permitting data transfer consumers and network access providers to take advantage of communication opportunities that may be mutually beneficial. ODT participants may be motivated to participate, for example, to reduce battery consumption and improve network coverage (e.g. by lower power transmissions to nearby ODT providers instead of higher power transmissions to distant cell towers), reduce network congestion and interference (e.g. by distributing transmissions, reducing transmission distance, power and retransmissions). A phone, for example, may be programmed to send data to an Internet destination by ODT in lieu of a cellular network under circumstances, such as cellular network unavailability, less costly data transfer or battery power conservation. ODTs may be ad hoc or preauthorized and may be tracked, accounted and compensated, e.g., according to ODT service terms selected by each provider.

Figure 2:
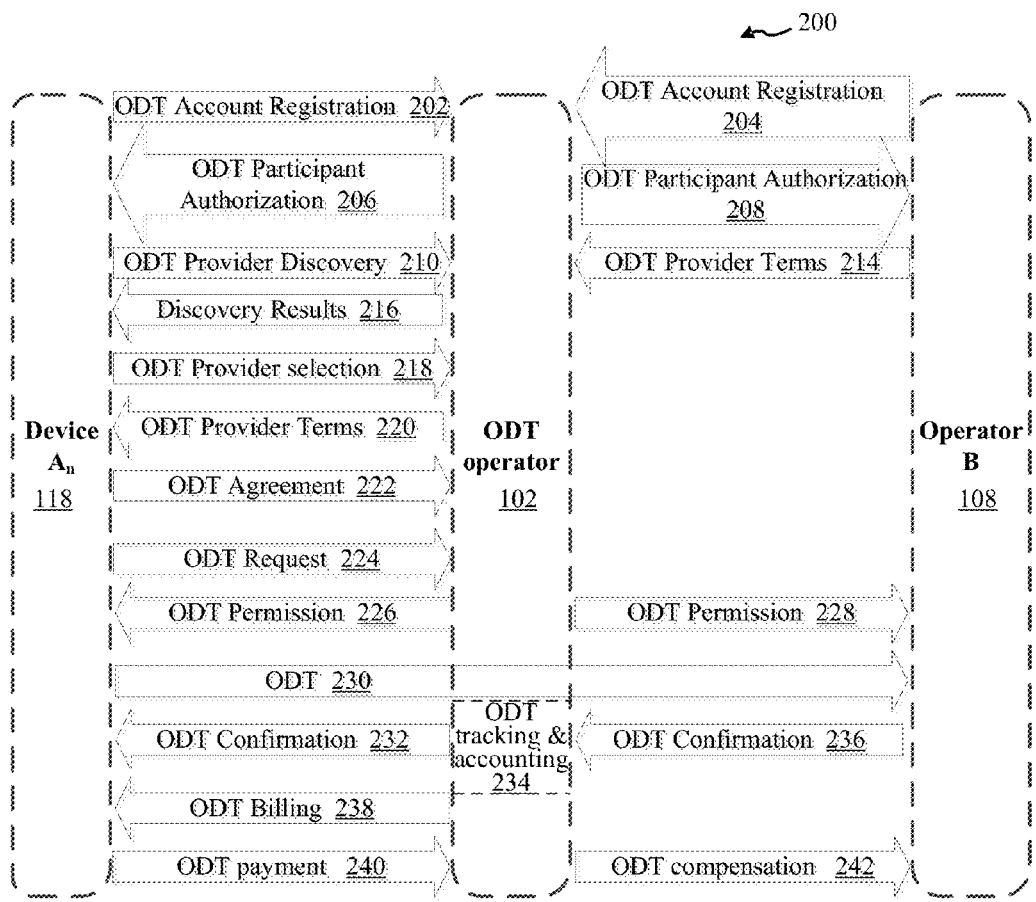
FIG. 2 shows an example of ODT-related interactions between an ODT operator, provider and consumer, according to an embodiment.

FIG. 2 shows a an example of ODT-related interactions between an ODT operator, provider and consumer. Continuing with the example shown in FIG. 1, device An 118 may be an ODT consumer while operator B 108 may be an ODT provider. Device An 118, operator B 108 and ODT operator 102 are shown in FIG. 2 along with examples of ODT-related communications transmitted between them. For instance, as shown in FIG. 2, communications 202, 210, 218, 222, 224, and 240 occur from device An 118 to ODT operator 102, communications 206, 216, 220, 226, 232, and 238 occur from ODT operator 102 to device An 118, communications 208, 228, and 242 occur from ODT operator 102 to operator B 108, communications 204, 214, and 236 occur from operator B 108 to ODT operator 102, and communication 230 occurs from device An 118 to operator B 108. Other examples and implementations may have the same or different number and type of interactions and the interactions may be with the same or different number and type of components. As an example, ODT operator 102 may be integrated in whole or in part in operator B 108.

ODT account registration 202 may be transmitted, for example, between prospective ODT participants, e.g., device An 118, and ODT operator 102. As an example, a device, such as device An 118, may have a user interface that permits an owner or user to download or otherwise access and activate an ODT registration procedure. A registration procedure may be used, for example, to provide information about device An 118 and/or to make selections, such as registering as one or more types of ODT participants, e.g., operator, consumer and/or provider. Continuing with the example shown in FIG. 1, device An 118 may register as an ODT consumer. A consumer may provide a name, address, account name, password, information about one or more devices that may be used on an account, billing information (e.g. bank account, credit card and/or other compensation, such as registration of a network operating device that may provide alternate compensation in the form of ODT data transfers). Information about devices may comprise, for example, a unique identifier, such as a MAC address.

ODT account registration 204 may be transmitted, for example, between prospective ODT participants, e.g., operator B 108, and ODT operator 102. As an example, a device, such as operator B 108, may have a user interface that permits an owner or user to download or otherwise access and activate an ODT registration procedure. A registration procedure may be used, for example, to provide information about operator B 108 and/or to make selections, such as registering as one or more types of ODT participants, e.g., operator, consumer and/or provider. Continuing with the example shown in FIG. 1, operator B 108 may register as an ODT provider. A provider may provide a name, address, account name, password, information about one or more devices that may be used on an account, compensation information (e.g. bank account and/or other types of compensation). Information about devices may comprise, for example, a unique identifier, such as a MAC address.

An ODT participant may specify custom ODT participation terms and/or accept or select one or more template, default or recommended ODT participation terms. Terms may be based on participation type, e.g., ODT operator, provider and/or consumer. As an example, operator B 108 may specify ODT provider terms 214. Terms may comprise, for example, ODT access time, communication type, technology, frequency, bandwidth, data limit, compensation and participant type (e.g. preauthorized, ad hoc). Service terms may comprise, for example, service restrictions, conditions and service agreement terms. As an example, operator B 108 may specify as provider terms that ODT-related communications are limited to 2.4 GHz frequency between 8 AM to 5 PM at a price per megabyte. As another example, device An 118 may specify consumer terms, such as communication type, technology, frequency, bandwidth and compensation. Participant terms may be used to search, filter, match and/or exclude various participants.

ODT participant authorization 206 may be transmitted, for example, following successful registration by device An 118 for one or more types of ODT participation, e.g., ODT consumer. Authorization may be indicated, for example, by providing an ODT certificate to device An 118, which may be used in subsequent ODT-related communications, such as ODT request, authentication and authorization/permission procedures.

ODT participant authorization 208 may be transmitted, for example, following successful registration by operator B 108 for one or more types of ODT participation, e.g., ODT provider. Authorization may be indicated, for example, by providing an ODT certificate to operator B 108, which may be used in subsequent ODT-related communications, such as ODT request, authentication and authorization/permission procedures.

ODT provider discovery 210 may be performed, for example, for authorized and/or unauthorized participants. Authorized participants may be deemed pre-authorized ODT participants while unauthorized participants may be deemed ad hoc ODT participants. Discovery may comprise one or more filters, such as geographic proximity of ODT participants. Discovery may take many forms. Discovery may be ad hoc (e.g. user request) and/or automated (e.g. periodically updated). As an example, ODT operator 102 may periodically update device An 118 with a list of compatible ODT providers in proximity to device An 118 as a user of device An 118 geographically relocates device An 118. Discovery may be conducted by one or more of an ODT operator, provider and consumer. ODT provider discovery 210 may be transmitted from device An 118 to ODT operator 102 as a request for provider discovery, in an embodiment. An ODT provider may advertise (e.g. broadcast) their ODT participant status. An ODT consumer may broadcast an ODT request and accumulate a list of ODT providers based on responses by ODT providers. An ODT operator may maintain a database of ODT participants and their periodically updated geographic locations. One or more algorithms may be used to search the database for periodic discovery and/or ad hoc discovery requests.

Discovery results 216 may be provided to a device, e.g., device An 118. One or more discovery filters may be applied by ODT operator 102 and/or by device An 118, for example, to provide the most compatible ODT provider(s). Filters may be based on, for example, ODT service terms. Discovery results may be weighted, e.g., based on application of one or more algorithms.

An ODT provider selection 218 may be transmitted to indicate a selection of one or more ODT providers automatically (e.g. based on an algorithm) by device An 118 and/or device An 118 may present a user with a user interface displaying none or more ODT providers available for selection.

ODT provider terms 220 may be provided to device An 118, e.g., by ODT operator 102, for example, after device An 118 makes a selection of an ODT provider. As an example, a user interface on device An 118 may present a user with ODT provider terms for review, acceptance or rejection. As another example, a user may predefine one or more terms that may be used by device An 118 to automatically accept or reject ODT provider terms. As an example, a user of device An 118 may specify a maximum compensation that may be used to filter potential providers and/or to reject provider terms in excess and accept provider terms that do not exceed a specified maximum or threshold compensation.

ODT agreement 222 may indicate that device An 118 accepted ODT provider terms. A rejection of terms may be given by a lack of response or an explicit rejection. An indication of agreement or rejection may be provided to ODT operator 102 and/or operator B 108.

An ODT request 224 may be provided to ODT operator 102 and/or operator B 108. An ODT request may indicate, for example, details about a pending or proposed data transfer, such as size, type of data. An ODT request may provide an authorization certificate or other indication of device An 118 being an authorized participant. ODT request and permission may be eliminated, for example, when ODT participant authorization and/or ODT provider term agreement procedures preauthorize ODTs for ODT consumers. An ODT request may be a first ODT-related communication, such as for an ad hoc ODT participant that is not yet an authorized ODT participant.

ODT permission 226 may be communicated to device An 118 and ODT permission 228 may be communicated to operator B 108. ODT operator 102 may process an ODT request 224, authenticate device An 118 as an authorized participant and proceed to authorize an ODT by device An 118 by indicating ODT permission. An indication of ODT permission may provide device An 118 and/or operator B 108 with user credentials, a communication key and/or other security technique to accomplish an authorized ODT. ODT permission may be merged with other communications, such as registration, authorization, discovery, etc., for example, for an ad hoc participant.

ODT 230 transfers data from device An 118 to data transfer destination 112 through network B 114, operator B 108 and network 106. ODT 230 may occur with or without involvement of ODT operator 102. Transmitted data may or may not be sent to ODT operator 102.

ODT confirmation 236 may be provided by operator B 108 to ODT operator 102. An ODT confirmation may, for example, confirm that operator B 108 received and forwarded data transmitted in ODT 230. Operator B 108 may provide an indication of failure when an error occurs. ODT confirmation 230 may indicate, for example, one or more parameters that may be tracked and accounted for by ODT operator 102.

ODT tracking and accounting 234 may be performed by ODT operator 102 to track and store one or more parameters for ODTs. Parameters may be used, for example, to determine success and failure rates, ODT consumer behavior, compensation, etc. ODT operator 102 or operator B 108 may provide ODT confirmation 232 to device An 118, for example, as a receipt of for ODT 230. ODT confirmation 232 may provide, for example, a day, time, data transfer size, an indication of success, compensation, reference number, and/or other ODT parameters.

ODT billing 238 may be provided by ODT operator 102 to device An 118 and/or other recipient(s) that may have been designated by a user of device An 118. ODT billing 238 may provide a reference number, which may be traced to ODT confirmation 232.

ODT payment 240 may be made by device An 118 or other source. Payment may be based on ODT agreement 222. Payment may take many forms. As an example, payment may be one or more of currency or a credit of bandwidth on device A0 116, operator A 104 or other device that may be sold or exchanged, e.g., by operator B 108 or an owner or user thereof. A marketplace of credits may be bought, sold or otherwise exchanged, for example, by ODT marketplace participants.

ODT compensation 242 may be provided by ODT operator 102 to operator B 108. ODT compensation may be all or a portion of a payment made in ODT payment 240. ODT operator 102 may receive a portion of payments. The ODT compensation may subtract from payment 240 any payments owed by an owner or user of operator B 108 having one or more ODT consumer devices (e.g. one or more of device B0 120 through device Bn 122) that may owe other ODT providers. In other words, ODT compensation 242 may be a balance or remainder after an accounting.

ODT-related communications (e.g. any one or more of 202-242) may be made with ODT participants and prospective ODT participants using non-ODT and/or ODT participants. Any one or more of ODT-related communications 202-242 may be merged and/or reorganized. As an example, registration, authorization, discovery, selection, ODT request, etc. may be merged and/or reorganized, for example, for an ad hoc ODT participant.

FIGS. 3-13 show flowcharts providing various processes related to enabling and performing ODT-related communications. FIGS. 3-13 are described as follows with respect to FIGS. 1 and 2 for purposes of illustration.

Figure 3:
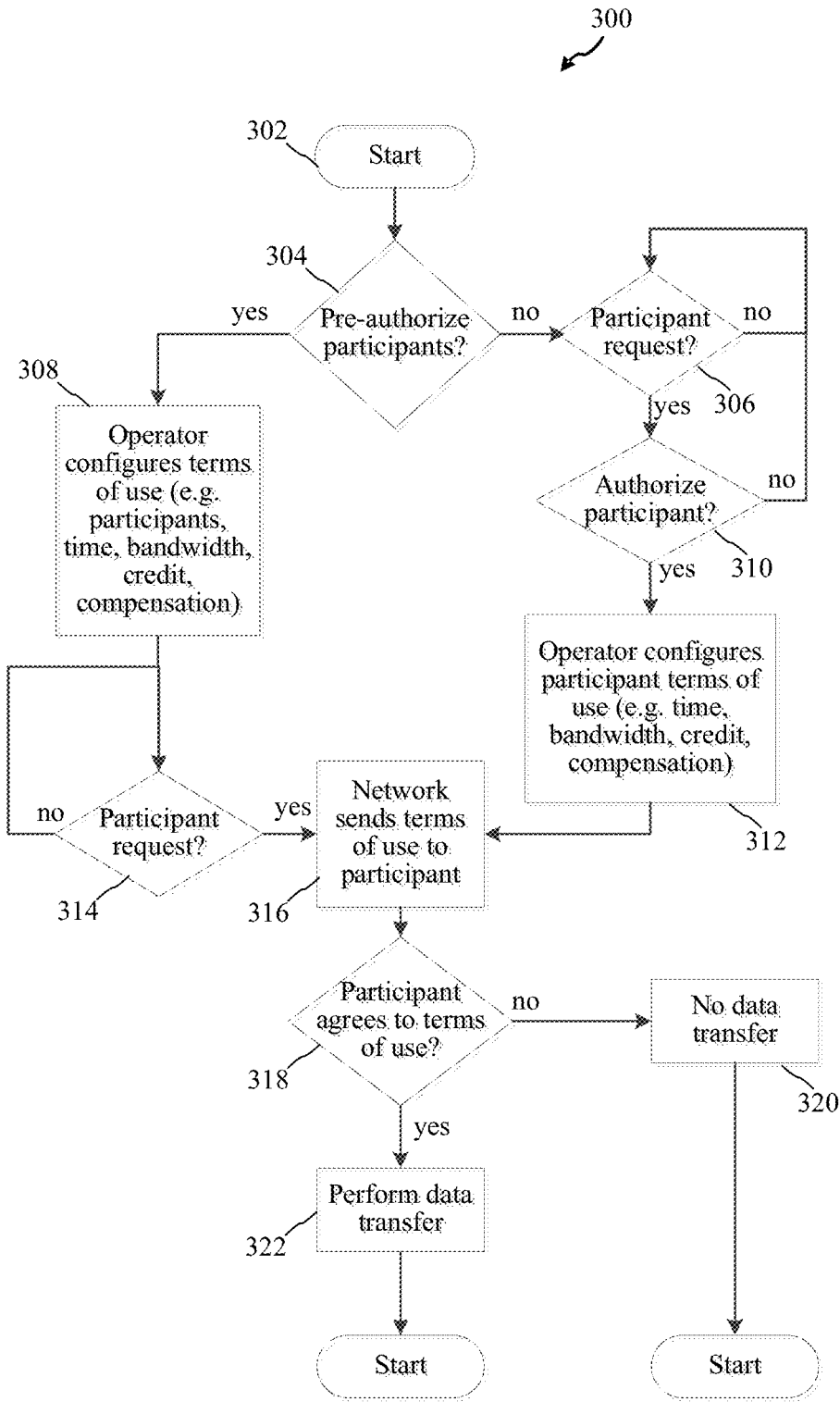
FIG. 3 shows a flowchart of an example of authorizing ODT participation and granting permission for an ODT, according to an embodiment.

For instance, FIG. 3 shows a flowchart 300 of an example of the authorizing of ODT participation and granting permission for an ODT. Flowchart 300 begins at start 302, which may be at the beginning, end or other position in a procedure. A determination 304 may be made whether participants are being preauthorized. If participants are being preauthorized, flowchart 300 proceeds from step 304 to step 308, where operator B 108 and/or ODT operator 102 may configure ODT service terms, such as participants, time, bandwidth, credit and compensation. Thereafter, flowchart 300 waits for a participant request 314. If participants are not being preauthorized, flowchart 300 proceeds from step 304 to step 306 to await a participant request. Upon receiving a participant request, a determination is made in step 310 whether to authorize a participant. If not, step 310 returns to step 306. If a participant is authorized, step 310 proceeds to step 312, where operator B 108 and/or ODT operator 102 may configure ODT service terms, such as time, bandwidth, credit and compensation. Steps 314 and 312 converge at step 316.

In step 316, ODT provider 102 or operator B 108 provides ODT service terms to device An 118. At step 318, a determination is made whether a user of device An 118 agrees to the ODT service terms. If not, flowchart 300 proceeds to step 320 and returns to start 302 without performing an ODT. If ODT service terms are agreed to, step 318 proceeds to step 322, where an ODT is performed. Flowchart 300 returns to start 302.

Figure 4:
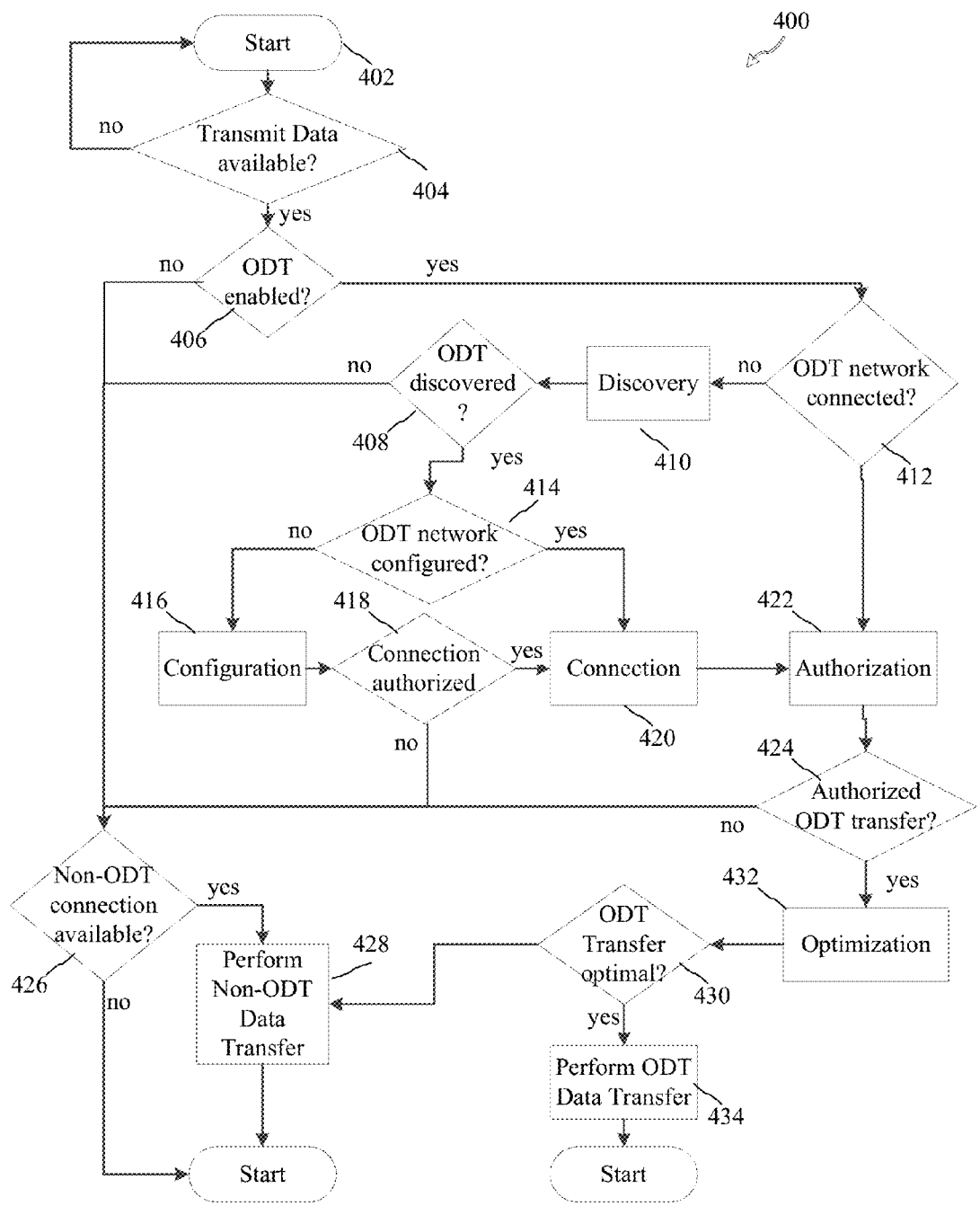
FIG. 4 shows a flowchart of example operation of a device that transfers data over a network to a destination through non-ODT and ODT networks, according to an embodiment.

FIG. 4 shows a flowchart 400 of example operation of a device that transfers data over a network to a destination through non-ODT and ODT networks. Flowchart 400 begins at start 402, which may be at the beginning, end or other position in a procedure. At 404, a determination is made whether device An 118 has data available for transmission. If data is available for transmission, step 404 proceeds to step 406, where a determination is made whether device An 118 has enabled ODT.

If ODT is not enabled, a procedure may begin to enable ODT or a determination may be made (e.g. in step 426) whether a non-ODT connection is available to transfer the data. If a non-ODT connection is not available, flowchart 400 may return to start 402. If a non-ODT connection is available, a non-ODT data transfer may occur in step 428 before returning to start 402.

If ODT is enabled, flowchart 400 proceeds to step 412, where a determination is made whether there is an existing ODT connection. If an ODT connection does not yet exist, discovery may occur in step 410. A failure to discover an ODT provider providing a network in step 408 may result in checking non-ODT connection availability in step 426. If an ODT network is discovered in step 408, in step 414 a determination is made whether the ODT network is configured. If not configured, an available ODT network may be configured in step 416. In step 418 a determination is made whether a connection is authorized. If not, a determination may be made whether a non-ODT connection is available in step 426. If a connection is authorized then a connection may be made in step 420. If an ODT network is configured in step 414, method 400 also proceeds to making a connection in step 420.

There being a connection in either step 412 or step 420, an ODT authorization procedure may begin in step 422. If an ODT is not authorized, a determination may be made whether a non-ODT connection is available in step 426. If an ODT is authorized, in step 432, an optimization procedure may operate to determine optimal ODT parameters and costs. Optimization may, for example, provide feedback from operator B 108 to device An 118 to permit device An 118 to determine whether to transmit at a higher or lower power level. Power may be decreased, for example, when signal strength is sufficient at a lower power transmission. Power may be increased, for example, to reduce errors and retransmissions. Optimization may, for example, reduce power consumption and conserve battery charge. In step 430, a determination is made whether an ODT is optimal, for example, compared to one or more non-ODT transfers and/or one or more other ODT-transfers. If an ODT cannot be made optimal or otherwise sufficient to satisfy an algorithm that determines which network to transmit data on, then step 430 may, for example, proceed to step 428 where the data may be transmitted by non-ODT network. If an ODT is optimal then the ODT may be performed in step 434 before returning to start 402.

Figure 5:
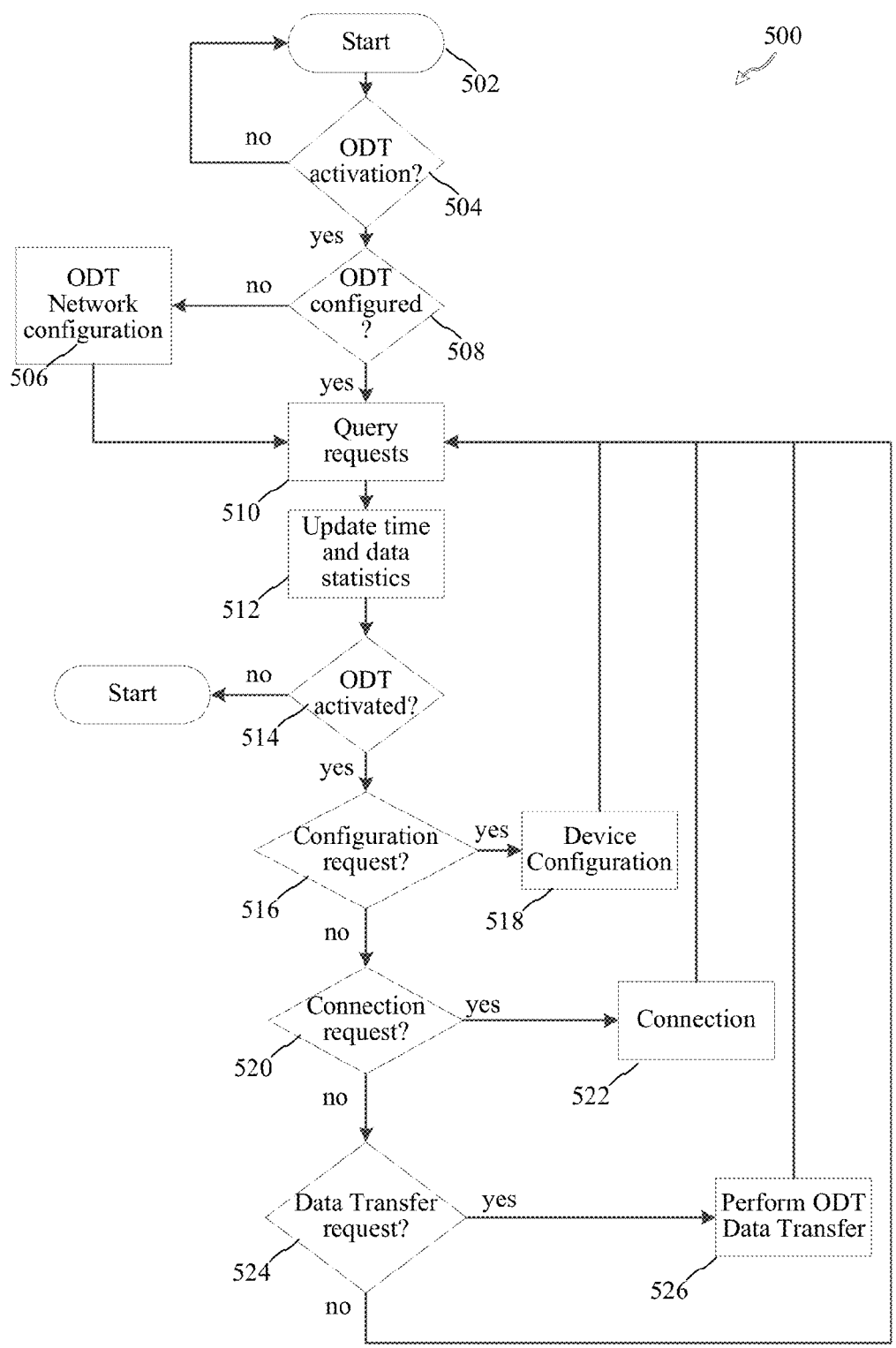
FIG. 5 shows a flowchart of an example of operation for a network access provider that may be an ODT provider, according to an embodiment.

FIG. 5 shows a flowchart 500 of an example of operation for a network access provider that may be an ODT provider. Flowchart 500 begins at start 502, which may be at the beginning, end or other position in a procedure. A determination 504 is made whether ODT has been activated. ODT may be activated, for example, by a user. ODT may be deactivated and reactivated, for example, based on terms of ODT service, such as time or data limits being reached or reset. If ODT is active, a determination 506 is made whether ODT has been configured. If not, an ODT network is configured 506. When an ODT is configured, ODT-related query requests 510 may be addressed.

Time and data statistics may be updated 512, for example, when a query request is made. At the time of a query, ODT service may be determined in 514 to be active or inactive. As an example, parameters of a query request (e.g., time, data size) may be compared to updated time and data statistics, which may be relevant to ODT service terms. If inactive, flowchart 500 may return to start 502 for activation or reactivation. ODT queries may be addressed in 516-526, for example, when ODT service is active.

A configuration request 516 may be addressed by configuring 518 a device, such as device An 118, e.g., for participation in an ODT network. A connection request 520 may be addressed by connecting 522 a device, such as device An 118, to an ODT network, such as network B 114, which may be limited to ODT-related communications. A connection may be, for example, connecting or pairing an ODT consumer as a time-limited guest on a network for ODT service. A data transfer or ODT request 524 may be addressed by performing 526 an ODT, such as from device An 118 to data transfer destination 112 through an ODT network, such as network B 114, and network 106. Other query requests may be addressed in flowchart 500 and/or other examples or implementations.

Figure 6:
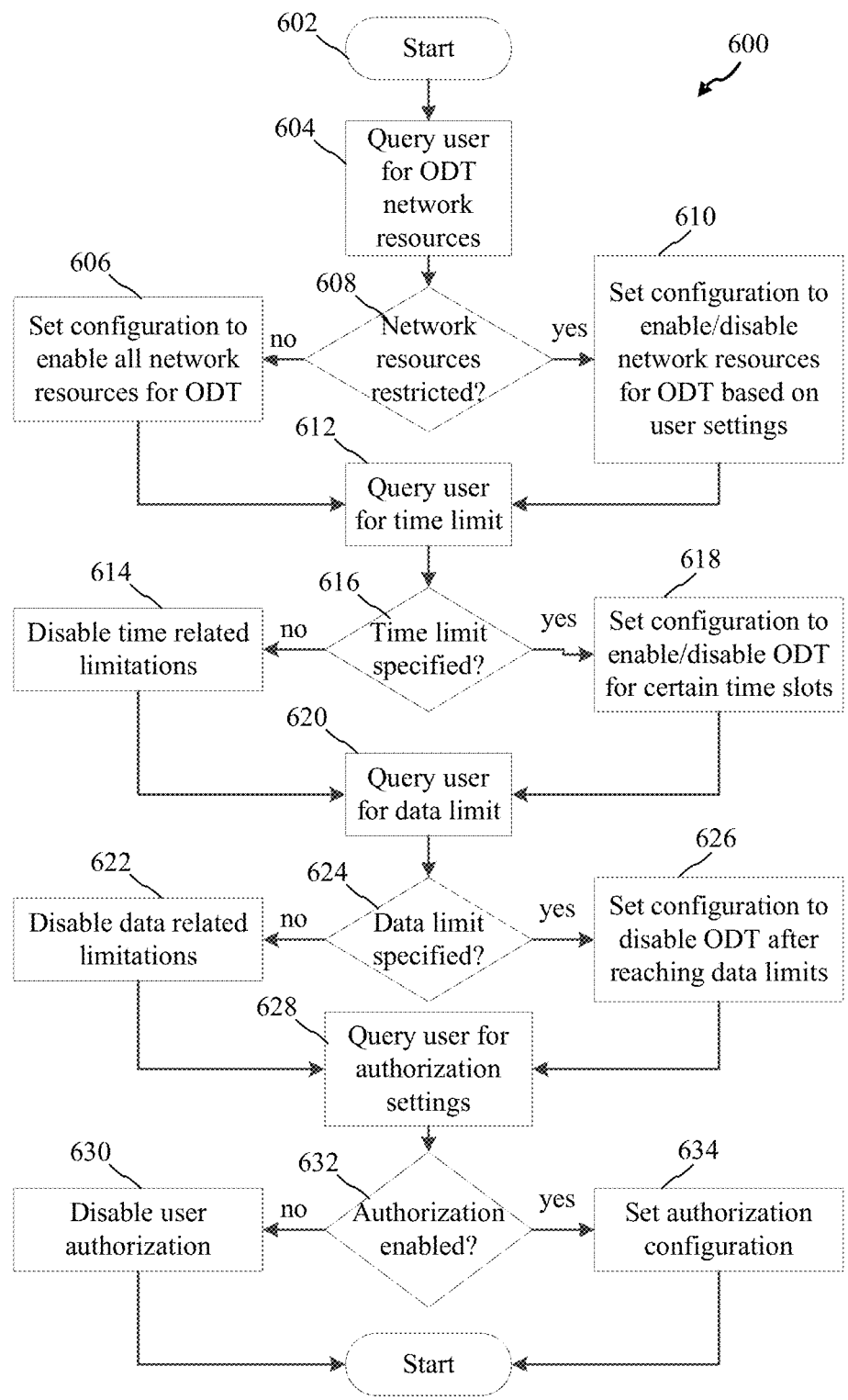
FIG. 6 shows a flowchart of an example of configuring a network access provider to be an ODT provider, according to an embodiment.

FIG. 6 shows a flowchart 600 of an example of configuring a network provider to be an ODT service provider. Flowchart 600 and/or other implementations may configure many network providers to add ODT services. Flowchart 600 may be implemented, for example, by operator B 108 and/or ODT operator 102, which may be on the same or different devices. Flowchart 600 may be used, for example, to configure operator B 108 as an ODT provider participant. Flowchart 600 begins at start 702, which may be at the beginning, end or other position in a procedure. A user, e.g., of operator B 108, may be queried 604 for resources available on a network, e.g., network B 114. A determination 608 is made whether network resources available for ODT service are or are not restricted. Operator B 108 and/or other devices may be configured 606 to enable all network resources for ODT. Operator B 108 and/or other devices may be configured 608 to restrict network resources for ODT, e.g., based on user settings, such as time, data, authorization, etc.

A user may be queried 612 to specify a time restriction for ODT services. A user may decide 616 to disable 614 time related limitations. A user may configure 618 ODT service to enable and disable ODT service based on one or more time restrictions, e.g., time slots. Time restrictions may be, for example, one time and/or periodic.

A user may be queried 620 to specify a data restriction for ODT services. A user may decide 624 to disable 622 data related limitations. A user may configure 626 ODT service to enable and disable ODT service based on one or more data restrictions, e.g., data limits. A data restriction may be, for example, a size limit in bytes per transaction, a cumulative total per time period, a fraction or percentage of available data bandwidth, etc.

A user may be queried 628 to specify one or more authorization settings for ODT services. A user may decide 632 to disable 630 user authorization requirements. A user may configure 634 ODT service with an authorization configuration. An authorization configuration may be, for example, no authorization, user authorization and/or data transfer authorization. No authorization may, for example, permit users to make ODTs without authorization. User authorization may, for example, permit an authorized user to engage in multiple ODTs without further authorization. Data transfer authorization may, for example, require an authorization for each ODT.

A user may be queried about ODT service terms or may enter them without being queried. As an example, a network operator may operate an IEEE 802.11 WLAN. An owner/operator of the network may restrict ODT service to 2.4 GHz signal frequency bandwidth, excluding the 5 GHz signal frequency bandwidth.

Figure 7:
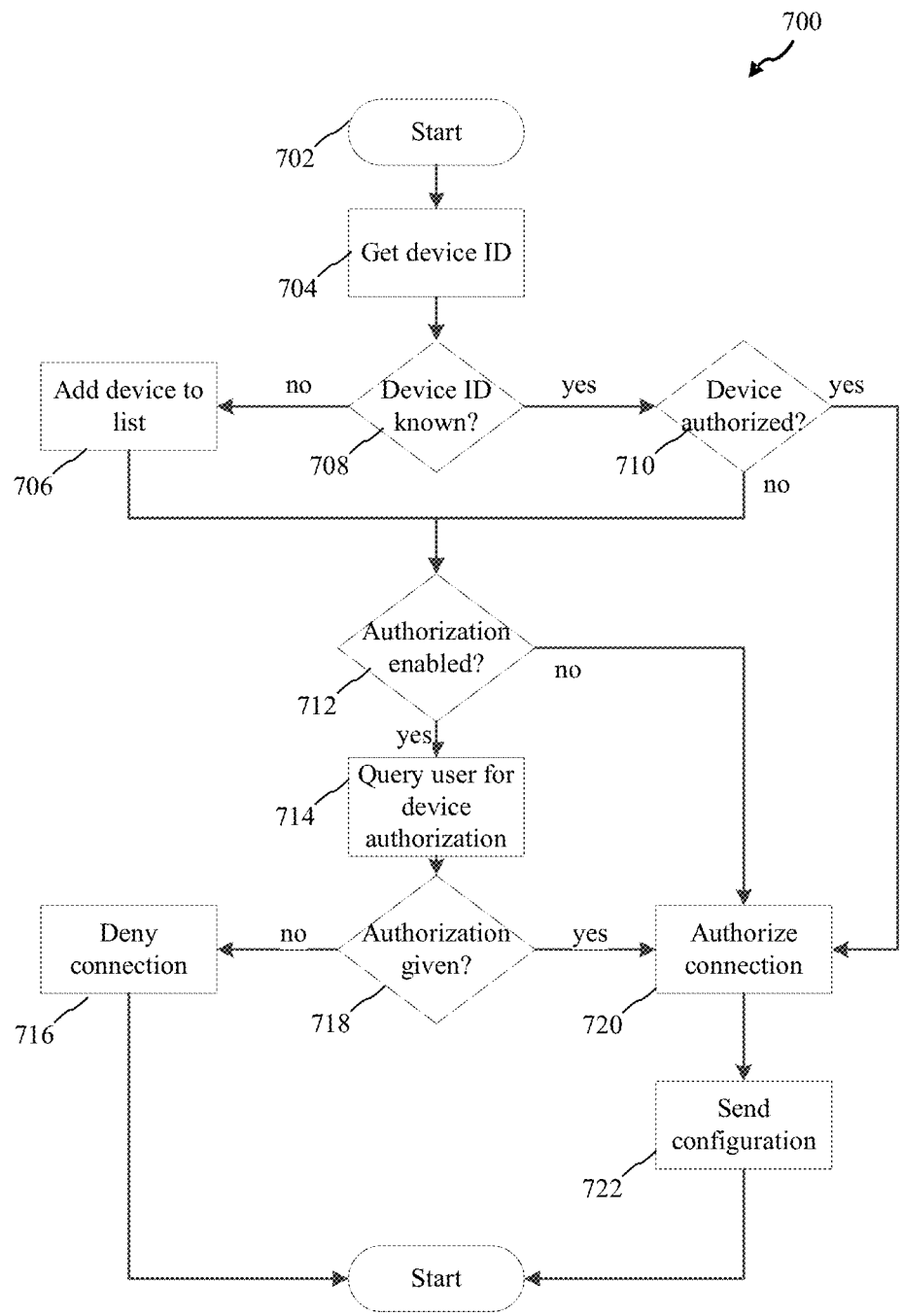
FIG. 7 shows a flowchart of an example of configuring a device to be an ODT participant, according to an embodiment.

FIG. 7 shows a flowchart of an example of configuring a device to be an ODT participant. Flowchart 700 may be implemented, for example, by operator B 108 and/or ODT operator 102. Flowchart 700 and/or other implementations may configure many devices as ODT consumers on one or more ODT networks. Flowchart 700 begins at start 702, which may be at the beginning, end or other position in a procedure.

A device ID may be acquired 704, such as a device ID for device An 118. A determination 708 may be made whether the device ID is known, e.g., to operator B 108 and/or ODT operator 102. When a device ID is known, a determination 710 may be made whether a device is authorized as an ODT participant. An authorized ODT participant may proceed to step 720. When a device is unknown, the device ID may be added 706 to a list of known device IDs for devices that have or have requested to use an ODT network. For unknown devices and unauthorized devices, a determination 712 may be made whether ODT authorization is enabled by the ODT provider. When authorization is not enabled/required by an ODT network provider, an ODT connection may be authorized 720. When authorization is enabled, a device, e.g., device An 118, may be queried 714 for device ODT authorization. A failure to provide ODT authorization may result in a denial 716 of an ODT connection. When authorization is provided, an ODT connection may be authorized 720 by an ODT provider, e.g., operator B 108. An ODT connection configuration may be provided 722 to a device having an authorized ODT connection. A configuration may comprise, for example, network resources, time limitations, data limitations, authorization scheme (e.g. authorization per user, device and/or ODT).

Figure 8:
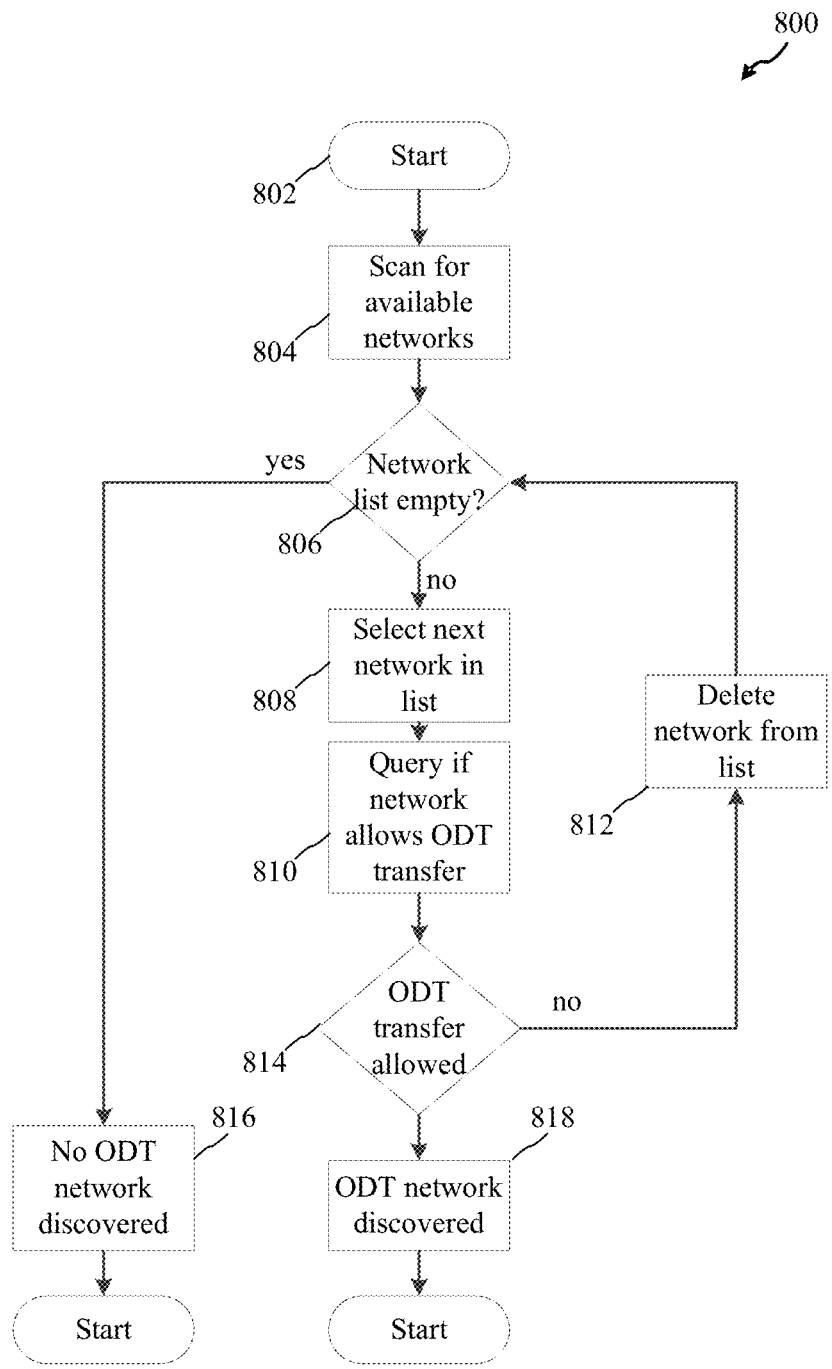
FIG. 8 shows a flowchart of an example of discovering ODT networks provided by ODT providers, according to an embodiment.

FIG. 8 shows a flowchart 800 of an example of discovering ODT networks provided by ODT providers. Flowchart 800 may be implemented, for example, by device An 118 and/or ODT operator 102. Flowchart 800 begins at start 802, which may be at the beginning, end or other position in a procedure.

A scan may be performed 804 for available networks and/or available ODT networks, which may broadcast a signal indicating their participation. A database of available ODT networks may also be maintained, for example, by ODT operator 102. Device An 118 may, for example, request available networks, for example, based on a proximity to device An 118. ODT operator 102 may, for example, scan a database for available networks. A determination 806 may be made whether there are any available networks and/or ODT networks. When no networks are found, an indication 816 may be provided, for example to device An 118, that no ODT network was discovered. When one or more networks are discovered, one or more networks may be selected 808 and queried 810 whether they allow ODTs or are ODT participants. A determination 814 may be made whether an ODT is allowed. When a network does not allow ODTs, it may be deleted 812 from a list of discovered networks. When a network does allow an ODT, an indication 818 may be provided, e.g., to device An 118, that an ODT network has been discovered. An indication may list one or more available ODT networks.

Figure 9:
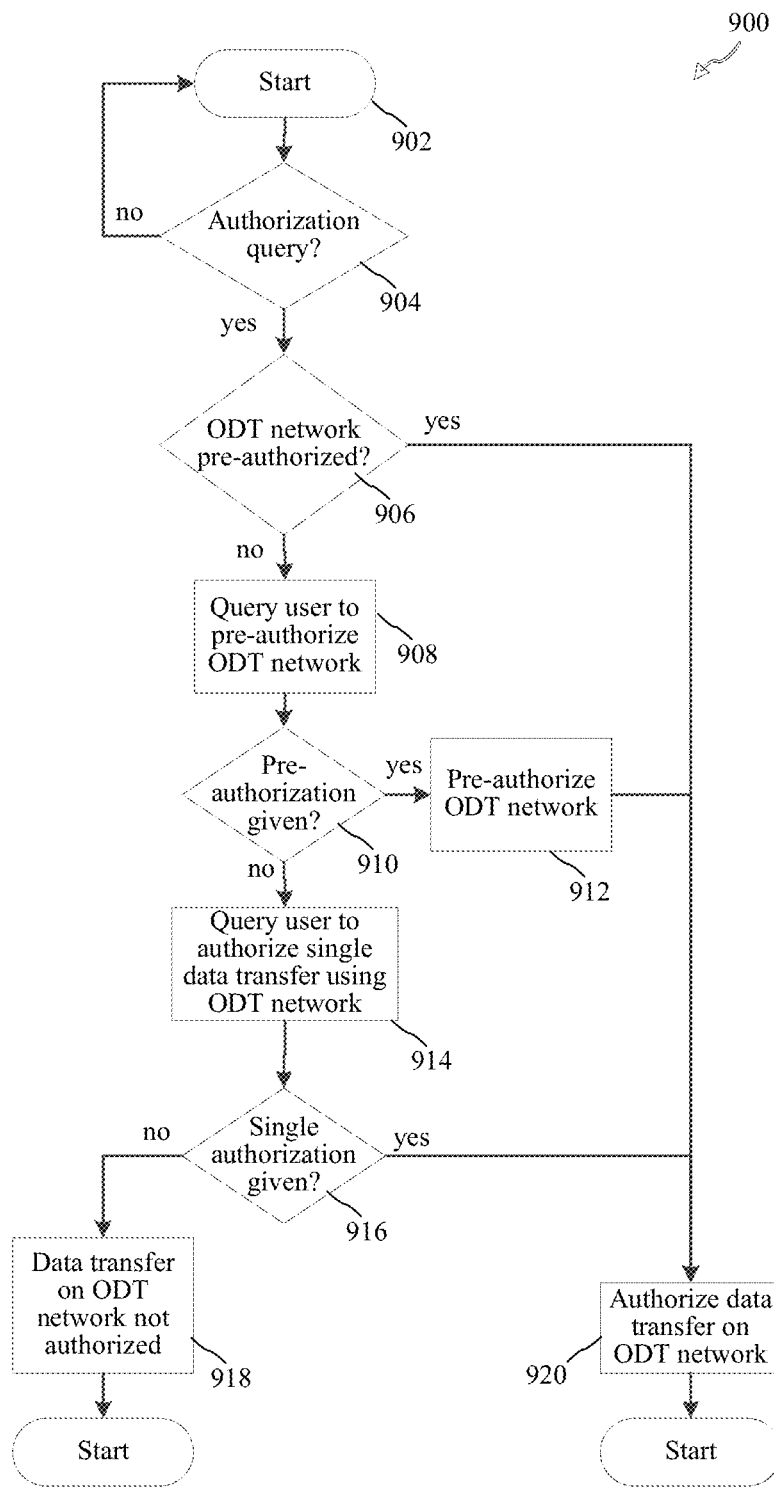
FIG. 9 shows a flowchart of an example of performing an ODT query and obtaining permission to perform an ODT on an ODT network, according to an embodiment.

FIG. 9 shows a flowchart 900 of an example of performing an ODT query and obtaining permission to perform an ODT on an ODT network. Flowchart 900 may be implemented, for example, by device An 118, operator B 108 and/or ODT operator 102. Flowchart 900 begins at start 902, which may be at the beginning, end or other position in a procedure.

A determination 904 may be made whether there is an authorization query for an ODT, for example, on a discovered, connected ODT network. When there is an ODT authorization query, a determination 906 may be made whether an ODT network has preauthorized ODT transfers. When ODT transfers are preauthorized, an indication may be provided that an ODT is authorized 920 on an ODT network. When an ODT is not preauthorized, a query 908 may be made requesting pre-authorization. A determination 910 is made whether to preauthorize ODT transfer(s). When pre-authorization is granted 912, an indication may be provided that an ODT is authorized 920 on an ODT network. When preauthorization is not granted, a query 914 may be made requesting one-time or single ODT authorization. A determination 916 is made whether to grant one-time ODT authorization. When authorization is granted, an indication may be provided that an ODT is authorized 920 on an ODT network. When authorization is not granted, an indication may be provided that an ODT is not authorized 918 on an ODT network.

Figure 10:
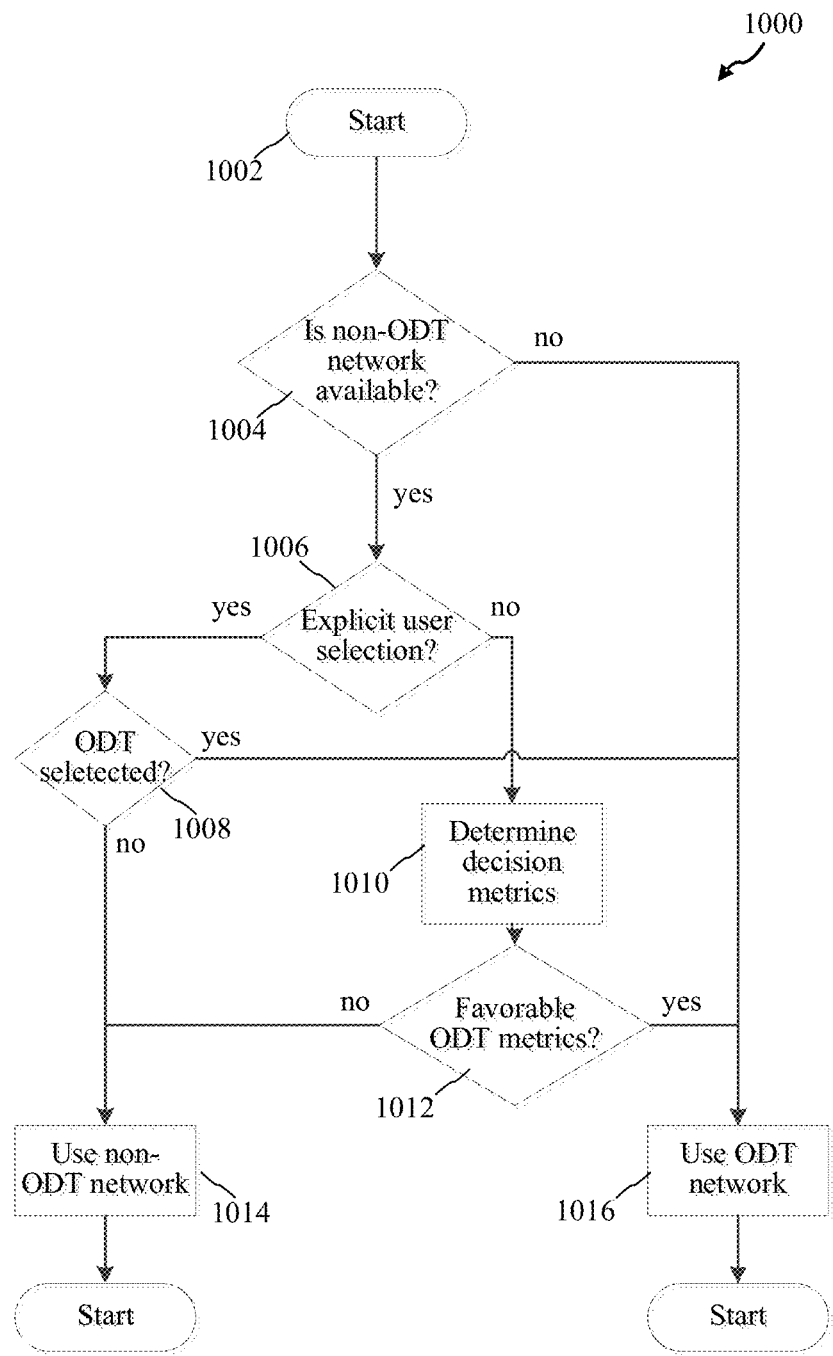
FIG. 10 shows a flowchart of an example of determining whether to perform a data transfer on a non-ODT network or an ODT network, according to an embodiment.

FIG. 10 shows a flowchart 1000 of an example of determining whether to perform a data transfer on a non-ODT network or an ODT network. Flowchart 1000 may be implemented, for example, by device An 118, operator B 108 and/or ODT operator 102. Flowchart 1000 begins at start 1002, which may be at the beginning, end or other position in a procedure.

A determination 1004 is made whether a non-ODT network is available. When a non-ODT network is not available, an indication 1016 may be provided to use an ODT network for a data transfer. When a non-ODT network is available, a determination 1006 may be made whether a user has made a selection that may override an algorithmic determination whether to perform a data transfer on an ODT or non-ODT network. When a user has made a selection, a determination 1008 may be made whether the user selected an ODT network. When an ODT network has been selected, an indication 1016 may be provided to use an ODT network for a data transfer. When a non-ODT network has been selected, an indication 1014 may be provided to use an ODT network for a data transfer. When a user has not made a selection, decision metrics may be determined 1010. A determination whether to perform a data transfer on an ODT or non-ODT network may be based, in whole or in part, on parameters or metrics for transferring data in one or more ODT and/or non-ODT networks. A metric may be, for example, power necessary for transmission of data. A determination 1012 may be made whether determined metrics are favorable to ODT. A determination algorithm, which may be standard or customized by a user, may weigh one or more costs, such as ODT compensation, non-ODT cost, battery consumption, etc. When metrics are favorable to ODT, an indication 1016 may be provided to use an ODT network for a data transfer. When metrics are not favorable to ODT, an indication 1014 may be provided to use an ODT network for a data transfer.

Figure 11:
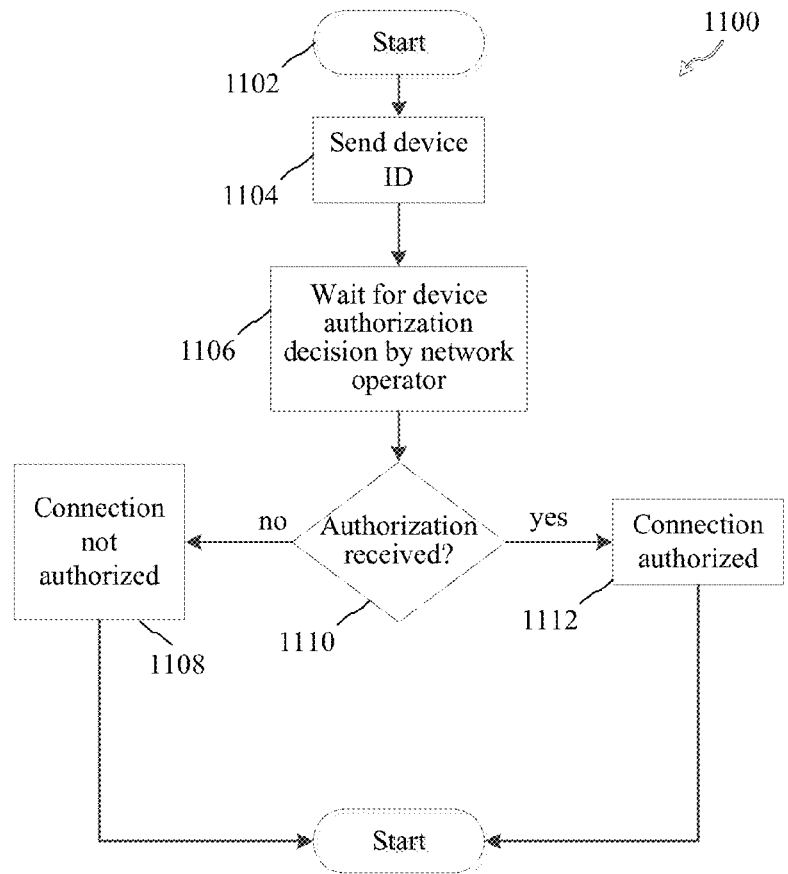
FIG. 11 shows a flowchart of an example of connecting to an ODT network to perform an ODT, according to an embodiment.

FIG. 11 shows a flowchart 1100 of an example of connecting to an ODT network to perform an ODT. Flowchart 1100 may be implemented, for example, by device An 118 and/or operator B 108. Flowchart 1100 begins at start 1102, which may be at the beginning, end or other position in a procedure.

An ODT consumer, e.g., device An 118, or ODT provider, e.g., operator B 108, may provide 1104 a device ID, e.g., for device An 118, to ODT operator 102 or operator B 108. Again, ODT operator 102 may be partially or wholly integrated with operator B 108. ODT consumer and/or ODT provider wait 1106 for device authorization decision by ODT operator 102. A determination 1110 may be made whether an authorization is received. When an authorization is not received, a connection may not be authorized 1108. When an authorization is received, a connection may be authorized 1112.

III. Further Exemplary Method Embodiments

Figure 12:
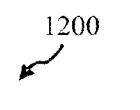
FIG. 12 shows an example of configuring consuming and providing devices to be ODT participants, according to an embodiment.

ODT features may be implemented in further processes or methods. For example, FIG. 12 shows a flowchart 1200 providing an example process for the configuring of consuming and providing devices to be ODT participants. Flowchart 1200 begins with step 1202. In step 1202, a providing device that provides a first wireless network is configured and a consuming device without access to the wireless network is configured to participate in an ODT from the consuming device to a destination on a second network via the first wireless network. For example, as shown in FIG. 1, providing device operator B 108 that provides network B 114 and consuming device An 118 without access to network B 114 are configured to participate in an ODT from device An 118 to data transfer destination 112 through network B 114 and network 106.

Figure 13:
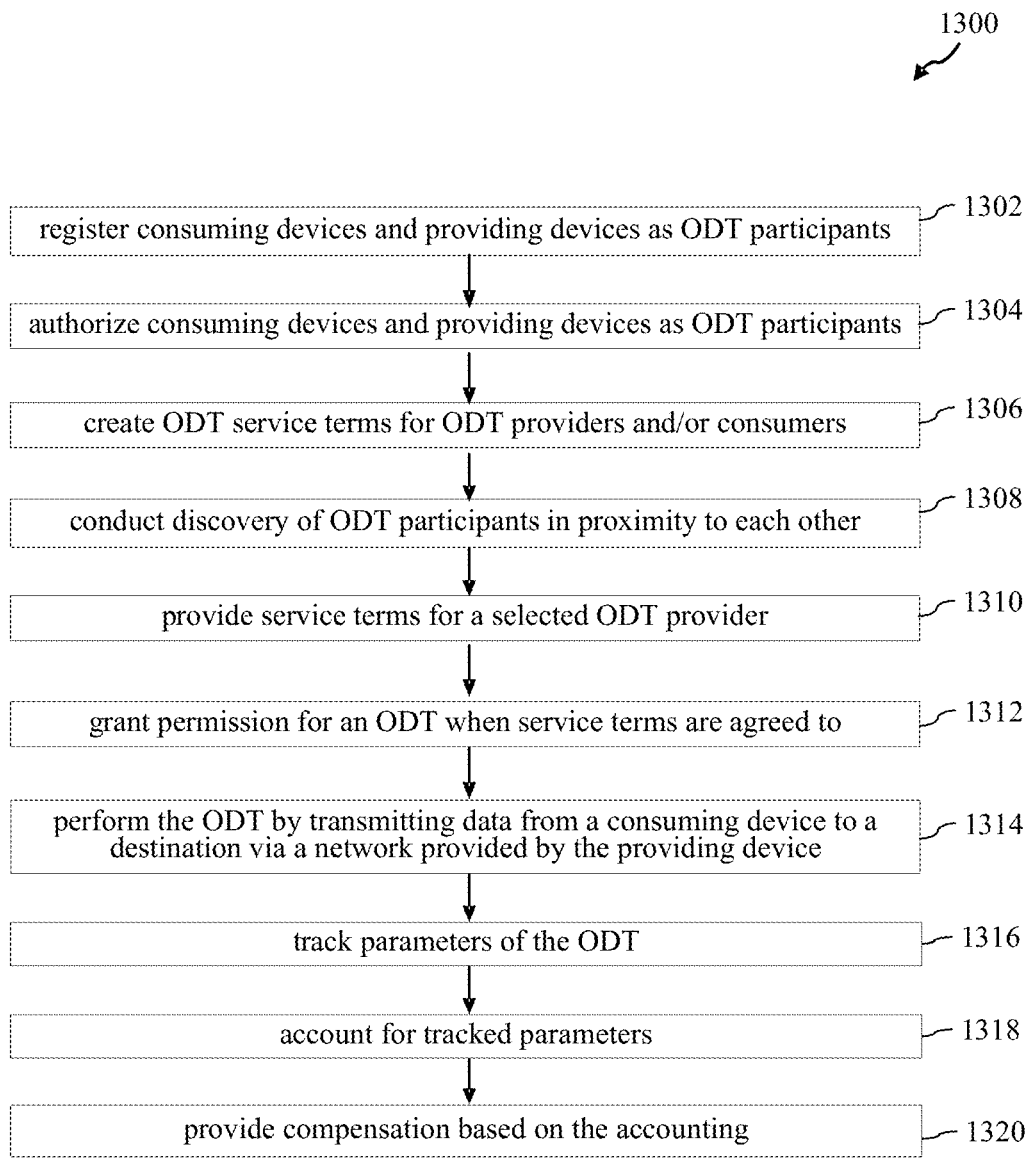
FIG. 13 shows an example of ODT operations from registration to compensation, according to an embodiment.

FIG. 13 shows a flowchart 1300 providing an example process for ODT operations from registration to compensation. For purposes of illustration, flowchart 1300 is described with respect to FIG. 2. Flowchart 1300 begins with step 1302. In step 1302, one or more consuming devices and one or more providing devices are registered as ODT participants. A consuming device may also be a providing device and/or ODT operator 102. For example, as shown in FIG. 2, device An 118 is registered 202 and operator B 108 is registered 204.

At step 1304, one or more consuming devices and one or more providing devices are authorized as ODT participants. For example, as shown in FIG. 2, device An 118 is authorized 206 and operator B 108 is authorized 208.

At step 1306, ODT services terms may be specified by one or more ODT consumers and one or more ODT providers. For example, as shown in FIG. 2, operator B 108 specifies ODT provider terms 214.

At step 1308, discovery may be conducted for ODT providers and/or consumers that may engage in ODTs. For example, ODT participants in proximity to one another may be discovered. One or more ODT participants may be notified of nearby ODT consumers and/or providers. For example, as shown in FIG. 2, ODT provider discovery 210 is conducted and device An 118 is provided with discovery results 216.

At step 1310, service terms for a selected ODT provider may be provided to an ODT consumer. For example, as shown in FIG. 2, device An 118 selects 218 an ODT provider and ODT operator 102 provides the selected ODT provider terms 220 to device An 118.

At step 1312, permission may be granted to an ODT when service terms are accepted. For example, as shown in FIG. 2, device An 118 accepts ODT service terms, creating an agreement 222. Device An 118 makes an ODT request 224. ODT operator 102 provides ODT permission 226 to device An 118.

At step 1314, an ODT may be performed by transmitting data from a consuming device to a destination via a network provided by a providing device that the consuming device otherwise has no access to. For example, as shown in FIG. 1, providing device operator B 108 that provides network B 114 and consuming device An 118 without access to network B 114 are configured to participate in an ODT from device An 118 to data transfer destination 112 through network B 114 and network 106.

At step 1316, parameters of the ODT are tracked and, at step 1318, the tracked parameters are accounted. For example, as shown in FIG. 2, ODT tracking and accounting 234 track and account for one or more parameters of an ODT 230 based on an ODT confirmation 236.

At step 1320, compensation may be provided based on the accounting. For example, as shown in FIG. 2, ODT compensation 242 is provided from ODT operator 102 to operator B 108, or an owner/operator thereof, e.g., according to ODT service terms 214.

Other structural and operational embodiments will be apparent to persons skilled in the relevant art(s) based on the disclosure. No order of steps is required unless expressly indicated or inherently required. There is no requirement that a method embodiment implement all of the steps illustrated in an example. Each example is simply one of many possible examples. Examples may be merged, separated and/or otherwise modified. Implementations may implement fewer, more, the same, different number and/or arrangement of steps.

As an example, an ODT may be implemented with one or more devices. As an example, an ODT may be communicated to device B0 120 then through network B 114 and operator B 108.

ODT provides data transfer functionality utilizing third party persons, devices and/or networks in proximity to an ODT consumer, which may be operating, for example, an IoT application. An ODT consumer may be referred to as an IoT application end point. Participants may opt in and/or out of ODT participation. Participation and/or ODTs may be pre-authorized and/or ad hoc. Participants may control which network resources are made available for ODTs, when ODT is permitted, who ODT is permitted for, ODT data bandwidth, frequency bandwidth, speed bandwidth, and for how much compensation. Ad hoc and/or preauthorized participants may discover one another, connect, optimize energy usage, reduce network congestion and interference, etc.

C. Example Computer System Implementation

Figure 14:
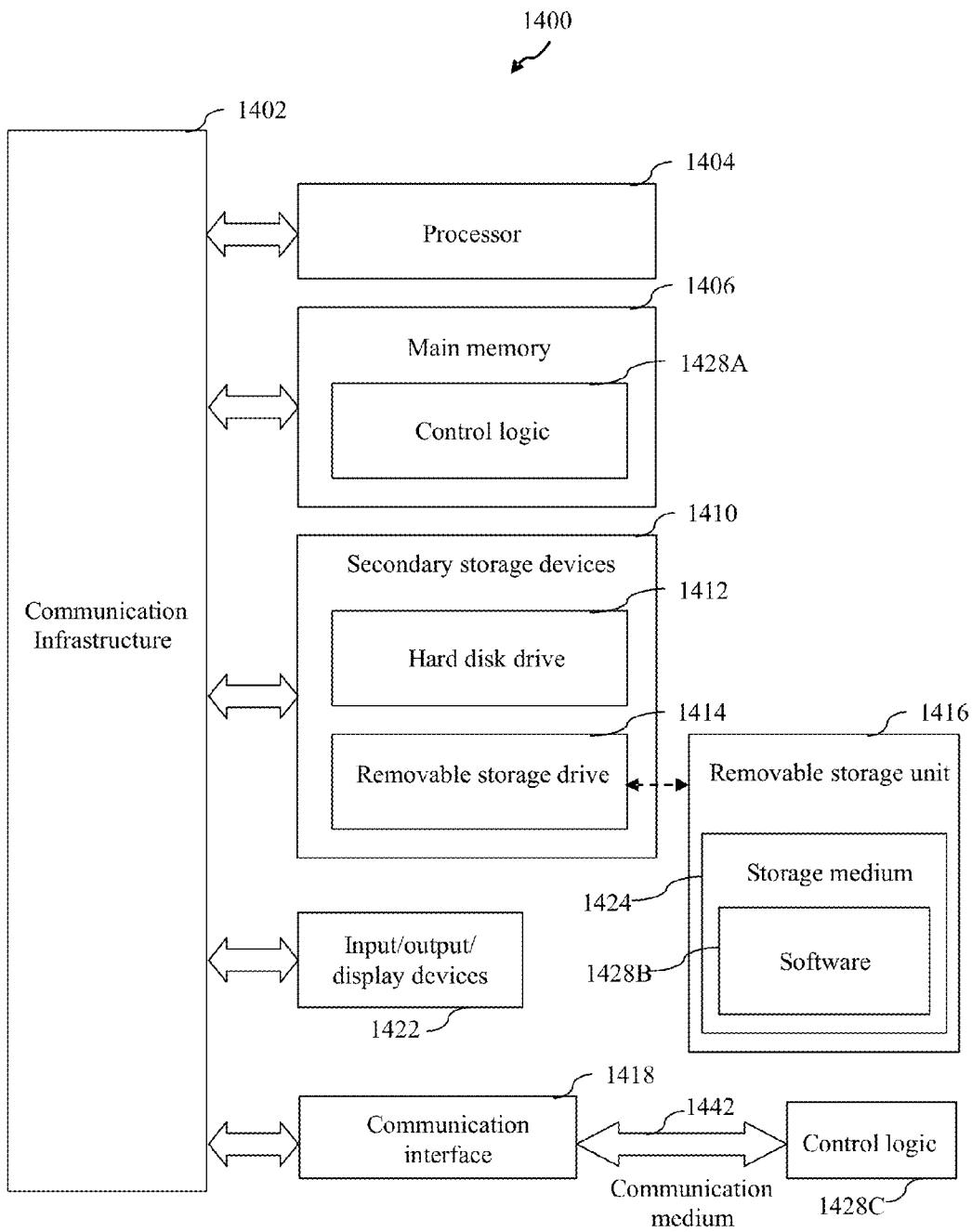
FIG. 14 shows an example of a computer in which ODT features may be implemented, according to an embodiment.

FIG. 14 shows an example of a computer in which ODT features may be implemented. Systems, devices and functionality shown in and discussed with respect to FIGS. 1-13, as well as any of the sub-systems or components contained therein, may be implemented in hardware (e.g. hardware logic/electrical circuitry), or hardware combined with one or both of software (e.g. computer program code configured to be executed in one or more processors) and/or firmware.

The embodiments described herein, including systems, methods/processes, and/or apparatuses, may be implemented using well known servers/computers, such as a computer 1400 shown in FIG. 14. For example, each of the devices, servers, components, and/or operations shown in FIGS. 1-13, as well as any of the sub-systems or components contained therein, may be implemented using one or more computers 1400.

Computer 1400 may be any available and well known computer capable of performing the functions described herein, such as computers available from International Business Machines, Apple, Sun, HP, Dell, Cray, etc. Computer 1400 may be any type of computer, including a desktop computer, a server, a mobile phone, etc.

Computer 1400 includes one or more processors (also called central processing units, or CPUs), such as a processor 1404. Processor 1404 is connected to a communication infrastructure 1402, such as a communication bus. In some embodiments, processor 1404 can simultaneously operate multiple computing threads.

Computer 1400 also includes a primary or main memory 1406, such as random access memory (RAM). Main memory 1406 has stored therein control logic 528A (computer software), and data.

Computer 1400 also includes one or more secondary storage devices 1410. Secondary storage devices 1410 include, for example, a hard disk drive 1412 and/or a removable storage device or drive 1414, as well as other types of storage devices, such as memory cards and memory sticks. For instance, computer 1400 may include an industry standard interface, such a universal serial bus (USB) interface for interfacing with devices such as a memory stick. Removable storage drive 1400 represents a floppy disk drive, a magnetic tape drive, a compact disk drive, an optical storage device, tape backup, etc.

Removable storage drive 1414 interacts with a removable storage unit 1416. Removable storage unit 1416 includes a computer useable or readable storage medium 1424 having stored therein computer software 1428B (control logic) and/or data. Removable storage unit 1416 represents a floppy disk, magnetic tape, compact disk, DVD, optical storage disk, or any other computer data storage device. Removable storage drive 1414 reads from and/or writes to removable storage unit 1416 in a well known manner.

Computer 1400 also includes input/output/display devices 1422, such as monitors, keyboards, pointing devices, etc.

Computer 1400 further includes a communication or network interface 1418. Communication interface 1418 enables computer 1400 to communicate with remote devices. For example, communication interface 1418 allows computer 1400 to communicate over communication networks or mediums 1442 (representing a form of a computer useable or readable medium), such as LANs, WANs, the Internet, etc. Communication interface 1418 may interface with remote sites or networks via wired or wireless connections.

Control logic 1428C may be transmitted to and from computer 1400 via the communication medium 1442.

IV. Conclusion

Methods, systems, and apparatuses have been described for ODT. ODT may improve network coverage, reliability and/or efficiency by permitting data transfer consumers and network access providers to take advantage of communication opportunities that may be mutually beneficial. Fixed and mobile, personal or business, wired or wireless devices (e.g. mobile phones, modems, routers) may participate as ODT network operators, providers and/or consumers. ODT participants may be motivated to participate, for example, to reduce battery consumption and improve network coverage (e.g. by lower power transmissions to nearby ODT providers instead of higher power transmissions to distant cell towers), reduce network congestion and interference (e.g. by distributing transmissions, reducing transmission distance, power and retransmissions). A phone, for example, may be programmed to send data to an Internet destination by ODT in lieu of a cellular network under circumstances, such as cellular network unavailability, less costly data transfer or battery power conservation. ODTs may be ad hoc or preauthorized and may be tracked, accounted and compensated, e.g., according to ODT service terms selected by each provider.

Techniques described herein may be implemented in hardware (digital and/or analog) or a combination of hardware with software and/or firmware component(s), including computer program products comprising logic stored on any discrete or integrated computer readable medium(s) comprising computer executable instructions that, when executed by one or more processors, provide and/or maintain one or more aspects of functionality described herein.

Proper interpretation of subject matter described herein and claimed hereunder is limited to patentable subject matter under 35 U.S.C. §101. As described herein and claimed hereunder, a method (e.g., as illustrated by a flowchart) is a process defined by 35 U.S.C. §101 and each of a circuit, device, apparatus, machine, system, computer, module, media and the like is a machine and/or manufacture defined by 35 U.S.C. §101.

Embodiments have been presented by way of example and not limitation. Embodiments are not limited to the functional blocks, detailed examples, steps, order or the entirety of subject matter presented. Alternative embodiments may use other techniques and/or steps within the spirit and scope of the disclosed technology. The exemplary appended claims encompass embodiments and features described herein, modifications and variations thereto as well as additional embodiments and features that fall within the spirit and scope of the disclosed technologies. Thus, the breadth and scope of the disclosed technologies is not limited by foregoing exemplary embodiments.

What is claimed is:

1. A method, performed by an opportunistic data transfer (ODT) operator, the method comprising:
   establishing, by the ODT operator, an ODT connection between a first providing device that provides a first wireless network and a first consuming device that does not have direct access to the first wireless network, to permit the first consuming device to participate in an our with a destination on a second network via the first wireless network, including
      receiving, from the first providing device, ODT service terms including an access time period and associated wireless frequency for the ODT connection to the first wireless network, and a data limit on an amount of data that can be communicated during the ODT connection over the first wireless network;
      sending the ODT service terms for the our connection to the first consuming device; and
      permitting the ODT connection based on agreement of the ODT service terms by the first consuming device to allow performance of the ODT connection consistent with the ODT service terms.

2. The method of claim 1, wherein establishing the ODT connection comprises:
   configuring the first providing device to receive and retransmit data for the ODT between the first consuming device and the destination via the first wireless network.

3. The method of claim 1, further comprising:
   adjusting a parameter of the ODT based on feedback provided by the first providing device.

4. The method of claim 1,
   wherein the ODT service terms further include compensation, participant type, and communication type.

5. The method of claim 1, further comprising:
   providing information about the ODT connection for ODT tracking, accounting and compensation.

6. A method comprising:
   providing opportunistic data transfer (ODT) services for an ODT connection between a first providing device that provides a first wireless network and a first consuming device that does not have direct access to the first wireless network, wherein the ODT connection permits the first consuming device to participate in an ODT with a destination on a second network via the first wireless network, including
      transmitting, from the first providing device to an ODT operator, ODT service terms including an access time period and associated wireless frequency for the ODT connection to the first wireless network, and a data limit on an amount of data that can be communicated during the ODT connection over the first wireless network; and
      performing the ODT connection by retransmitting data on the second network to the destination received via the first wireless network from the first consuming device.

7. The method of claim 6, further comprising:
   registering by the first providing device as an ODT participant.

8. The method of claim 6, further comprising:
   storing ODT service terms for the first provider device; and
   providing the stored ODT service terms to the ODT operator for notice to the first consuming device upon request for ODT service.

9. The method of claim 6, further comprising:
   receiving a request for ODT service from the first consuming device.

10. The method of claim 6, further comprising:
    responding to discovery for ODT providing devices in proximity to the first consuming device.

11. The method of claim 6,
    wherein the ODT connection is performed based on acceptance of the ODT service terms specified by the first provider device.

12. The method of claim 11,
    wherein the ODT service terms are offered to the first consuming device as preauthorization before the first consuming device requests ODT service and as ad hoc authorization at the time the first consuming device requests ODT service.

13. The method of claim 6, further comprising:
    tracking at least one parameter of the ODT;
    accounting the at least one tracked parameter; and
    billing based on the accounting.

14. The method of claim 6, further comprising:
    providing ODT services for a plurality of ODT consuming devices.

15. A method comprising:
    participating, by a first consuming device for a first communication, in an opportunistic data transfer (ODT) with a first destination on a second network via a first wireless network that the first consuming device does not have direct access to for the first communication, wherein a first providing device is configured to permit the first consuming device to participate in the ODT via an ODT connection over the first wireless network; and
    selecting between ODT and non-ODT options to perform data transfer for a second communication between the first consuming device and a second destination, wherein the selecting is based on expected power consumption of first consuming device for the ODT and non-ODT options.

16. The method of claim 15, further comprising:
    discovering ODT providing devices in proximity to the first consuming device; and
    selecting the first providing device from the discovered ODT providing devices.

17. The method of claim 15, further comprising:
accepting ODT service terms comprising ODT access time, frequency bandwidth, and data limit.

18. The method of claim 17, wherein at least a portion of the ODT service terms are specified by an owner or operator of the first providing device.

19. The method of claim 15, further comprising:
adjusting a parameter of the ODT based on feedback provided by the first providing device.

20. The method of claim 17, wherein the ODT service terms further include at least one of compensation for the ODT, participant type, or communication type.

* * * * *

UNITED STATES PATENT AND TRADEMARK OFFICE
CERTIFICATE OF CORRECTION

PATENT NO. : 9,769,865 B2
APPLICATION NO. : 14/746442
DATED : September 19, 2017
INVENTOR(S) : Blanksby et al.

Page 1 of 1

It is certified that error appears in the above-identified patent and that said Letters Patent is hereby corrected as shown below:

In the Claims

In Column 17, Lines 32-33, replace "an our" with --an ODT--.

In Column 17, Line 41, replace "the our connection" with --the ODT connection--.

In Column 18, Line 61, replace "consumption of first consuming device" with --consumption of the first consuming device--.

Signed and Sealed this
Fourth Day of June, 2019

Andrei Iancu
*Director of the United States Patent and Trademark Office*